US009179322B2

(12) United States Patent
Roberts et al.

(10) Patent No.: US 9,179,322 B2
(45) Date of Patent: Nov. 3, 2015

(54) SYSTEM AND METHOD FOR ALLOCATING SPECTRUM USING DYNAMICALLY ADJUSTED SEPARATION DISTANCES FOR MITIGATING INTERFERENCE

(71) Applicant: Spectrum Bridge, Inc., Lake Mary, FL (US)

(72) Inventors: Robin U Roberts, Orlando, FL (US); Jeffery C Schmidt, Orlando, FL (US); Peter Stanforth, Winter Springs, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 120 days.

(21) Appl. No.: 14/173,206

(22) Filed: Feb. 5, 2014

(65) Prior Publication Data

US 2014/0221000 A1  Aug. 7, 2014

Related U.S. Application Data

(60) Provisional application No. 61/760,969, filed on Feb. 5, 2013.

(51) Int. Cl.
*H04W 72/00* (2009.01)
*H04W 16/14* (2009.01)
*H04W 64/00* (2009.01)

(52) U.S. Cl.
CPC .............. *H04W 16/14* (2013.01); *H04W 64/00* (2013.01)

(58) Field of Classification Search
USPC ........ 455/404.2, 432.1, 434, 435.2, 436, 440, 455/442, 443, 450, 456.1, 464; 370/329, 370/331, 333, 338–341
See application file for complete search history.

(56) References Cited

U.S. PATENT DOCUMENTS

| | | | |
|---|---|---|---|
| 2009/0011788 A1* | 1/2009 | Shan et al. ..................... | 455/522 |
| 2010/0304680 A1* | 12/2010 | Kuffner et al. ............... | 455/63.1 |
| 2011/0087639 A1* | 4/2011 | Gurney ......................... | 707/690 |
| 2011/0222493 A1* | 9/2011 | Mangold et al. .............. | 370/329 |
| 2011/0310867 A1* | 12/2011 | Kennedy et al. .............. | 370/338 |
| 2012/0202510 A1* | 8/2012 | Singh .......................... | 455/452.1 |
| 2013/0336241 A1* | 12/2013 | Keon ............................ | 370/329 |
| 2014/0179336 A1* | 6/2014 | Steer ........................... | 455/456.1 |

* cited by examiner

*Primary Examiner* — Dai A Phuong
(74) *Attorney, Agent, or Firm* — Tucker Ellis LLP

(57) ABSTRACT

Allocating spectrum to a secondary radio device includes determining a contour separation distance for the secondary radio device. The contour separation distance is a function of a minimum separation distance from protected areas of primary radio devices and an accuracy variance for the secondary radio device. The accuracy variance is specified as a distance and is a function of accuracy information for a reported location of the secondary radio device. If a distance between a contour of a protected area for a primary radio device and the reported location for the secondary radio device is less than the contour separation distance, a channel used by the primary radio device is not available for use by the secondary radio device for wireless communications. Otherwise the channel used by the primary radio device is available for use by the secondary radio device for wireless communications.

20 Claims, 3 Drawing Sheets

SYSTEM AND METHOD FOR ALLOCATING SPECTRUM USING DYNAMICALLY ADJUSTED SEPARATION DISTANCES FOR MITIGATING INTERFERENCE

RELATED APPLICATION DATA

This application claims the benefit of U.S. Provisional Patent Application No. 61/760,969, filed Feb. 5, 2013, the disclosure of which is herein incorporated by reference in its entirety.

TECHNICAL FIELD OF THE INVENTION

The technology of the present disclosure relates generally to wireless communications and, more particularly, to a system and method for allocating spectrum using dynamically adjusted separation distances between primary and secondary spectrum users to mitigate the potential for interference between users.

BACKGROUND

Spectrum sharing is one of the most viable ways of improving the amount of spectrum available to wireless networks and other radio devices for conducting wireless communications. An exemplary spectrum sharing technique involves use of television white spaces under regulations set forth by an appropriate regulatory agency. An exemplary regulatory agency that regulates the use of wireless spectrum is the U.S. Federal Communications Commission (FCC). Other countries may have similar regulatory entities.

In the U.S., for example, the FCC has eliminated analog television (TV) broadcasts in favor of digital TV broadcasts. This has freed spectrum channels for use by unlicensed radio systems to offer various services, such as mobile communications and Internet access. In this context, the freed spectrum is commonly referred to as TV white space (or TVWS) but other types of white spaces are possible. In the case of TV white space, the white space includes unused spectrum that is interleaved with spectrum used by incumbent radio devices in the channel 2 to channel 51 range (corresponding to 54 MHz to 698 MHz). Exemplary incumbent radio devices for TV white space include television broadcasters and other priority users of television channels.

Under FCC regulations, for example, radio devices that use TVWS must contact a central database server (also referred to as a spectrum management server) and receive a channel list (also referred to as a channel map) of available channels for which the radio device may use in a shared environment with other TV band devices (TVBDs). The channel list that is generated for a TVBD by the central database server is based on the location of the TVBD and its radio characteristics. In this manner, the operation of incumbent radio devices having protected areas in which the TVBD is located will be taken into account when determining channel availability.

A concern expressed by the operators of incumbent radio devices is how the incumbent spectrum use will be protected from the potential effects of interference by TVBDs. The solution of choice is a geo-location database (e.g., the above-noted central database server) that is capable of managing the allocation of spectrum in accordance with policies defined in terms of geography, time, frequency and other application parameters, such as transmit power and emissions characteristics. But this methodology is predicated on a radio device being able to accurately report its location and characteristics (such as antenna height, gain, and emissions characteristics). If a device reports a location that is not accurate, the device may gain access to spectrum for which it would not otherwise have been permitted to use. Therefore, inaccurate location reporting may result in a higher likelihood of interference.

The process of spectrum management by a geo-location database system to protect the operation of incumbent radio systems relies on geographic coordinates reported by managed radio devices to be relatively accurate. For example, a geo-location database that operates in accordance with white spaces regulations, such as those promulgated by the FCC in the U.S. under 47 C.F.R. §15.701 et. seq., uses the location reported by a TVBD in a channel allocation request to provide a channel list of available TV white space channels to the TVBD for use in wireless communications by the TVBD. To provide an accurate list of available channels, the reported location is required by the FCC rules to be accurate to ±50 meters.

The accuracy requirement is used to ensure that the geographic coordinates are precise enough to provide effective protection for incumbent spectrum users. Additionally, separation distances between the white spaces radio and the protected radio devices are defined by contours that are specified such that the distances are adequate to provide protection based on the degree of location accuracy (e.g., the above-noted ±50 meters to TVWS). But the FCC regulations for TV white spaces only specify a single accuracy requirement and, correspondingly, only specify one set of separation distances. So if the radio cannot determine its geographic coordinates to the required accuracy, the radio is not permitted to receive a spectrum allocation.

For portable devices, such as mobile telephones, tablet computers, etc., the current location of the device is typically provided by a built-in geo-location determination technology of the device, such as GPS. Fixed location devices also may use this approach. But an incorporated geo-location capability cannot always provide sufficient accuracy. For example, a device located indoors or in a highly obstructed environment may not be able to determine its location using GPS within an accuracy of ±50 meters.

An example of a geo-location determination technique that has relatively low precision (e.g., location accuracy of greater than 50 meters) is GPS with an indicator of precision (e.g., a dilution of precision or DOP) that indicates a relatively low accuracy in the determined location coordinates. Another example is Apple Inc.'s "iOS horizontalAccuracy" (unspecified confidence). Google Inc.'s "Android location.GetAccuracy" (68% confidence) also has location accuracy of greater than 50 meters. Other examples include cellular site triangulation and WiFi access point proximity (e.g., as a service available from Skyhook Wireless, Inc. of Boston, Mass.).

DETAILED DESCRIPTION OF EMBODIMENTS

Figure 1:
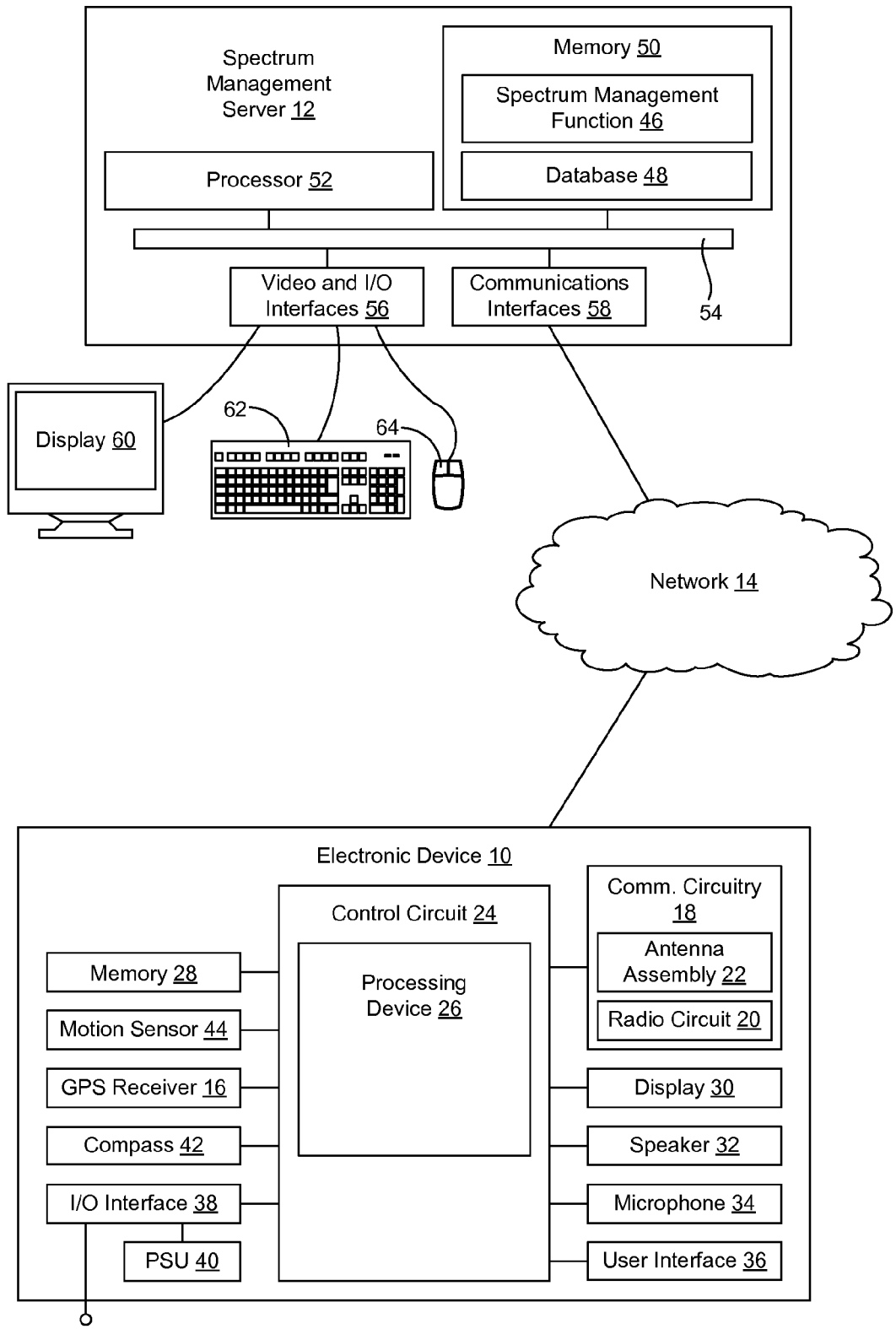
FIG. 1 is a schematic view of an exemplary system for allocating spectrum using dynamically adjusted separation distances based on location accuracy.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. INTRODUCTION

Described are techniques to make use of geo-location information as part of making spectrum allocations, even where the geo-location information may have been determined using an imprecise technique. Low precision geo-location determination techniques include those listed above where the geo-location information may not be accurate to within 50 meters.

The methods and systems disclosed herein dynamically adjust contour separation distances used by a geo-location database system to maintain a specified level of protection for primary radio devices when the accuracy of a location reported for a secondary radio device is not precise or does not meet a certain accuracy parameter.

In the described and illustrated embodiments, a secondary radio device is an electronic device that includes a radio for engaging in wireless communications with another electronic device. In one embodiment, the electronic device is a television band radio device (TVBD) that seeks a channel list of available TV white space channels from a spectrum management server. The available channels may be used by the electronic device to carry wireless communications in a spectrum sharing environment.

For purposes of description, the electronic device will be described in the context where the electronic device is a TVBD. It will be appreciated, however, that the electronic device may be another type of device. The electronic device, whether a TVBD or some other type of device, may be configured as a mobile telephone, a computer (e.g., a laptop computer or a tablet computer), a mobile WiFi hotspot device, a media player, a gaming device, a personal digital assistant (PDA), an electronic book reader, a WiFi router, a wireless access point, etc. The electronic device may have a fixed location or may be portable. Also, as used herein, the term electronic device may be an electronic system that includes one or more than one device that is capable of performing wireless communications. As an example, the electronic device may be a radio system, such as a network that offers connectivity services to client devices.

In the context of white spaces, the white spaces may be television white spaces or some other form of useable spectrum that is interleaved with spectrum used by incumbent, licensed or existing users, even if that spectrum is not referred to as white space by a governing regulatory entity. It will be appreciated, however, that the techniques described in this document may apply to other situations, including situations that do not involve the selection of an operational channel.

Aspects of the disclosed systems and methods are independent of the type or types of devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the electronic device, the type of data or information that is transmitted, how the electronic device uses received information, and other similar communications considerations. Thus, the systems and methods have application in any suitable environment.

In embodiments in this disclosure, the server may undertake spectrum management functions other than those that are described in detail, such as responding to white space channel list requests with appropriate channel lists. Therefore, in some embodiments, the server may be considered a central white space registration system.

B. SYSTEM ARCHITECTURE

Referring initially to FIG. 1, shown is a system that includes an electronic device 10 and a spectrum management server 12. The electronic device 10 typically, but not necessarily, has Internet communication capabilities via a wireless and/or wired connection. The electronic device 10 may be any type of electronic device, as indicated above. The server 12 communicates with the electronic device 10 and other devices over any appropriate medium. For example, the electronic device 10 may communicate with the server 12 through a network 14 or other appropriate medium, such as one or more of the Internet, a cellular network, a WiFi network, etc. The server 12 may be a central white space registration system or some other form of spectrum management platform.

The electronic device 10 is location aware. For instance, the electronic device 10 may be capable of determining its geo-location using a location-determining technique, such as GPS or other technology. In some embodiments, the electronic device 10 may have a GPS receiver 16 that is used to receive GPS satellite signals from which location coordinates are triangulated. In the case of a fixed location device, the electronic device 10 may store location data that has been determined in advance.

The electronic device 10 includes communications circuitry 18. In the illustrated exemplary embodiment, as part of the communications circuitry 18, the electronic device 10 includes a radio circuit 20 and an antenna assembly 22. The communications circuitry 18 may be used to carry out various wireless communications functions, including communicating with the server 12. In the exemplary case where the electronic device 10 is a mobile telephone, the communications functions may include engaging in voice or video calls, and sending or receiving messages (e.g., email messages, text messages, multimedia messages, instant messages, etc.), accessing the Internet, etc.

The illustrated components of the communications circuitry 18 may represent one or more than one radio transceiver to enable the electronic device 10 to be able to communicate over various types of network connections and/or protocols. For instance, the electronic device 10 may be configured to communication with a cellular-switched communications network. Exemplary cellular communications network types include, by are not limited to, networks operating in accordance with global system for mobile communications (GSM), enhanced data rates for GSM evolution (EDGE), code division multiple access (CDMA), wideband CDMA (WCDMA), integrated services digital broadcasting (ISDB), high speed packet access (HSPA), or any other appropriate standard or advanced versions of these standards. The cellular communications networks may be compatible with 3G and/or 4G protocols.

Additionally, or as an alternative to cellular communications capability, the electronic device 10 also may be configured to communicate with other types of networks, such as a packet-switched network. An exemplary packet-switched network includes a network configured in accordance with IEEE 802.11 (e.g., IEEE 802.11a, IEEE 802.11b, or IEEE 802.11n), each of which are commonly referred to as WiFi. Another exemplary packet-switched network includes a network configured in accordance with IEEE 802.16 (commonly referred to as WiMAX).

Overall functionality of the electronic device 10 may be controlled by a control circuit 24 that includes a processing device 26. The processing device may execute code stored in a memory within the control circuit 24 and/or in a memory 28 separate from the control circuit 24 in order to carry out the operations of the electronic device 10. For instance, the processing device 26 may be used to execute an operating system and other applications that are installed on the electronic device 10. The operating system or applications may include executable logic to implement the functions of the electronic device 10 that are described herein.

The memory 28 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 28 includes a non-volatile memory for long term data storage and a volatile memory that functions as system memory for the control circuit. The memory 28 may exchange data with the control circuit 24 over a data bus. Accompanying control lines and an address bus between the memory 28 and the control circuit 24 also may be present.

The electronic device 10 may include a display 30 for displaying visual information to a user. Also, the electronic device 10 may include a speaker 32 and a microphone 34 to allow the user to carry out audio functions. One or more user interfaces 36, such as a keypad and/or a touch-sensitive input associated with the display 30, may be present to provide for a variety of user input operations.

The electronic device 10 may further include one or more input/output (I/O) interface(s) 38. The I/O interface(s) 38 may include one or more electrical connectors for connecting the electronic device 10 to another device (e.g., a computer) or an accessory (e.g., a personal handsfree (PHF) device) via a cable, and/or for connecting the electronic device 10 to a power supply. Therefore, operating power may be received over the I/O interface(s) 38 and power to charge a battery of a power supply unit (PSU) 40 of the electronic device 10 may be received over the I/O interface(s) 38. The PSU 40 may supply power to operate the electronic device 10 in the absence of an external power source.

A compass 42 may be used to determine the orientation of the electronic device 10. One or more motion sensors 44, such as accelerometers, may be used to sense movement of the electronic device 10. The electronic device 10 may include additional components for adding other functionality or may include fewer than the above-described components.

The server 12 may be implemented as a computer-based system that is capable of executing computer applications (e.g., software programs), including a spectrum management function 46 that, when executed, carries out functions of the server 12 that are described herein. The spectrum management function 46 and a database 48 may be stored on a non-transitory computer readable medium, such as a memory 50. The database 48 may be used to store various information sets used to carry out the functions described in this disclosure. The memory 50 may be a magnetic, optical or electronic storage device (e.g., hard disk, optical disk, flash memory, etc.), and may comprise several devices, including volatile and non-volatile memory components. Accordingly, the memory 50 may include, for example, random access memory (RAM) for acting as system memory, read-only memory (ROM), solid-state drives, hard disks, optical disks (e.g., CDs and DVDs), tapes, flash devices and/or other memory components, plus associated drives, players and/or readers for the memory devices.

The server 12 may store or access data about known protected radio devices, which are referred to as incumbent devices or as primary radio devices. The electronic device 10 is considered a secondary radio device 10 that may not cause interference to reception of signals from the primary radio devices in respective protected areas.

To execute logical operations, the server 12 may include one or more processors 52 used to execute instructions that carry out logic routines. The processor 52 and the memory 50 may be coupled using a local interface 54. The local interface 54 may be, for example, a data bus with accompanying control bus, a network, or other subsystem.

The server 12 may have various input/output (I/O) interfaces 56 as well as one or more communications interfaces 58. The interfaces 56 may be used to operatively couple the server 12 to various peripherals, such as a display 60, a keyboard 62, a mouse 64, etc. The communications interface 58 may include for example, a modem and/or a network interface card. The communications interface 58 may enable the server 12 to send and receive data signals, voice signals, video signals, and the like to and from other computing devices via an external network. In particular, the communications interface 58 may connect the server 12 to the network 14.

In one embodiment, the server 12 may be configured to host the below-described services for a plurality of electronic devices, including the electronic device 10. In some embodiments, the services may include spectrum management functions, such as providing channel lists to qualified radio devices upon registration so as to allow the radio devices to make use of spectrum for wireless communications. Also, while the providing of services may be fully automated, the server 12 may host an Internet-style website for the various corresponding parties to conduct initial enrollment with the server 12, conduct manual registration if needed, access various tools and reports supplied by the server 12, and so forth. For supplying the services, the server 12 may collect spectrum usage information from various sources, including but not limited to public databases, private databases and deployed radio devices (e.g., in the form of channel use selections or spectrum sensing results). The database information may contain information about known spectrum users, such as incumbent spectrum users (e.g., digital television stations, wireless microphone systems, cable head end systems, FM radio stations, etc.), licensed spectrum users, or radio systems that are exempt from seeking channel map information in order to operate.

C. EXEMPLARY SPECTRUM ENVIRONMENT

Available, interference-free spectrum for supporting wireless communications is a scarce resource and the demand for wireless communications is increasing. The following techniques assist in using spectrum efficiently by allocating spectrum to secondary users while minimizing interference between incumbent spectrum users and the secondary spectrum users.

With additional reference to FIG. 2, the techniques will be described in an exemplary environment where the electronic device 10 and protected (primary) radio devices 66 share a common set of bands. In the illustrated exemplary embodiment, the electronic device 10 includes a low-power, broadband data transceiver that operates with a transmit power at about +30 dbm in white spaces that are interleaved with channels used by television transmitters (the devices 66) that can operate with a transmit power up to +90 dbm. Thus, the electronic device 10 may be a TVBD but could be another type of device. Also, the protected radio devices 66 may be radio devices other than television transmitters, including devices that transmit with relatively low power, or a combination of radio types.

In the illustrated example, there are four protected radio devices 66 in the vicinity of electronic device 10, but there may be more than or fewer than four protected devices 66. These exemplary protected devices 66 are respectively labeled 66a, 66b, 66c and 66d. The protected devices 66 operate in respective protected areas 68a, 68b, 68c and 68d that are defined by protected contours labeled 70a, 70b, 70c and 70d. The illustrated protected contours 70 are each approximately the same size and shape, but it will be understood that they will typically have various sizes and shapes. Also, protected areas 70 may overlap with one another if the respective protected radio devices 66 operate on different channels.

The protected areas 70 are established to reduce interference to the receipt of signals from the protected radio devices 66 by limiting the use of the channel on which each protected radio device 66 operates (referred to as the primary channel of the protected radio device 66) by other devices (e.g., the electronic device 10) in the respective protected area 68.

Figure 2:
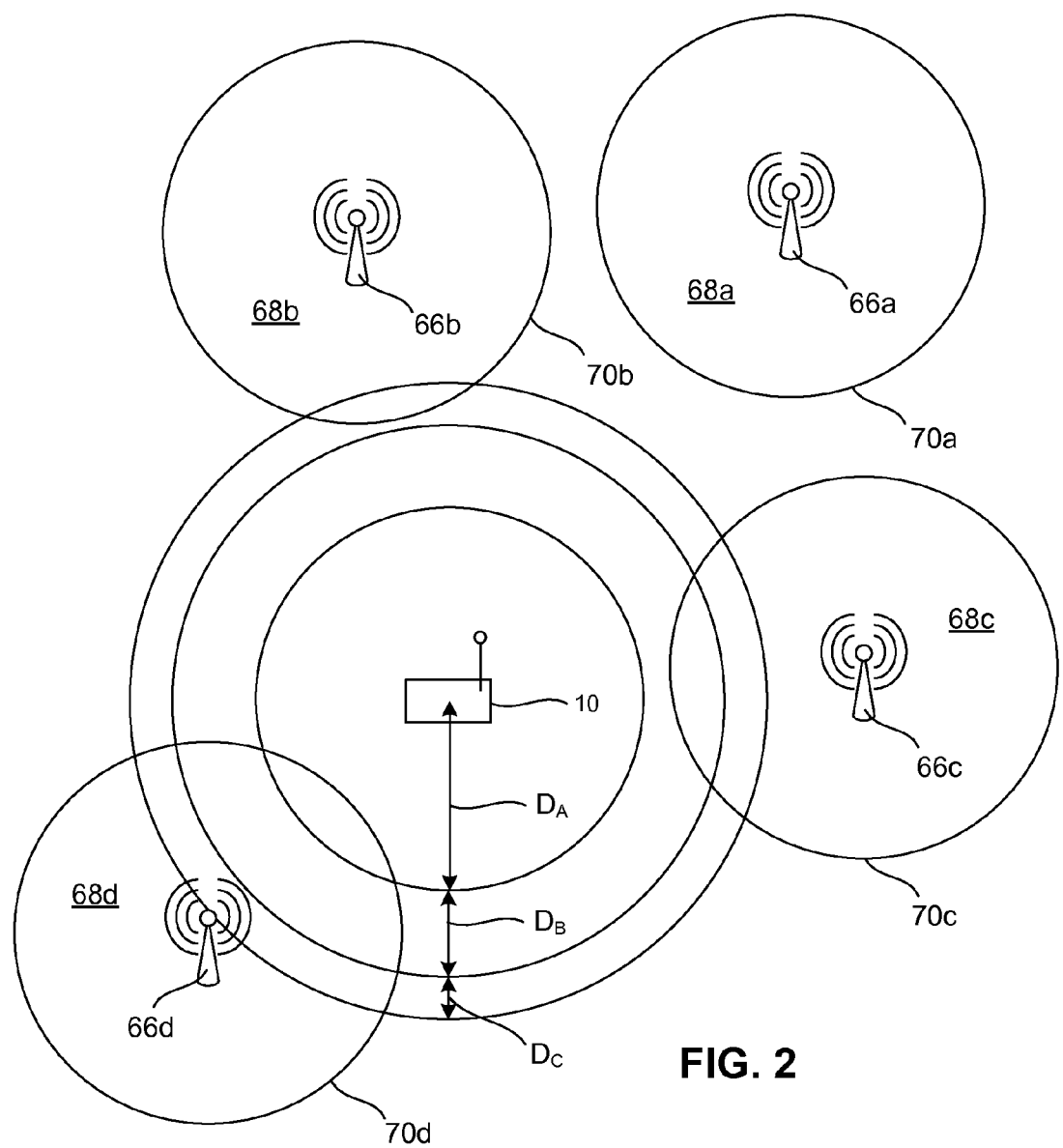
FIG. 2 is a representative operational environment for an electronic device that requests a spectrum allocation.

It will be appreciated that the schematic illustration of FIG. 2 is not to scale. Rather, FIG. 2 is used for descriptive purposes to represent several instances of relative positioning between the electronic device 10 and protected radio devices 66.

D. SPECTRUM ALLOCATION USING DYNAMIC ADJUSTMENT OF SEPARATION DISTANCE

The availability of certain frequencies, such as white space channels, for use by secondary devices (e.g., electronic device 10) is a function of time, channel use, and geographic area. If an area bound by a contour defined by a separation distance for the electronic device 10 overlaps with a protected area 68 of a protected radio device 66, then the primary channel of the protected radio device 66 will not be available for use by the electronic device 10.

Channel availability for the electronic device 10 based on incumbent protections is determined by a geo-location based spectrum management database system (e.g., the spectrum management server 12). With this database-driven approach, it is possible for the server 12 to dynamically adjust a separation distance for the electronic device 10, instead of applying a separation distance that is defined by regulation and is static for the electronic device 10 over time. To ensure that incumbent protections are maintained, a separation distance for the electronic device 10 is dynamically increased beyond a minimum separation distance. The amount that the minimum separation distance is increased may be a distance that the location accuracy for a location reported by the electronic device 10 exceeds a location accuracy threshold (e.g., the 50 meter accuracy specified for TV white spaces management).

In one embodiment, the spectrum management server 12 provides available spectrum information (e.g., a channel list) to the electronic device 10. The logical operations to accomplish this task may be carried out for each of multiple electronic devices 10 that seek spectrum allocations from the server 12.

Figure 3:
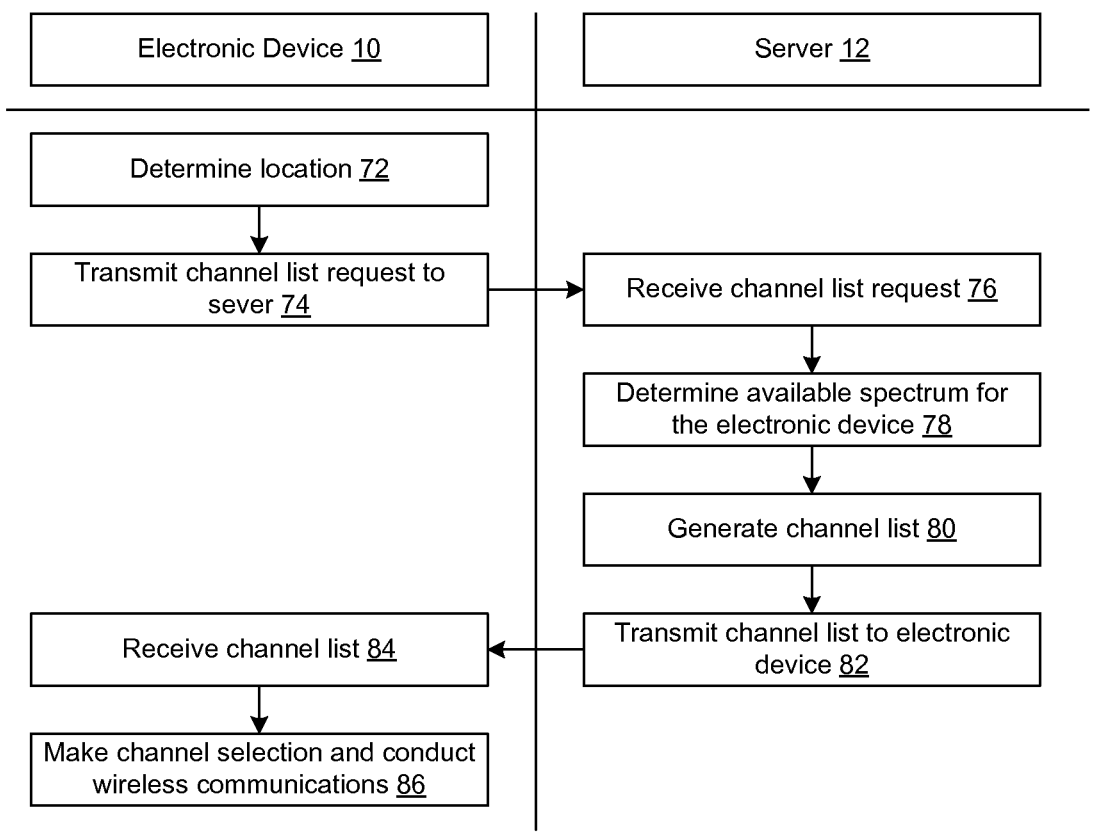
FIG. 3 is a flow diagram representing logical operations carried out by the electronic device and a spectrum management server.

With additional reference to FIG. 3, illustrated are logical operations carried out by the electronic device 10 and carried out by the server 12 to implement respective methods of seeking spectrum access and providing available spectrum information. The exemplary methods may be respectively carried out by cooperatively executing a software function in the electronic device 10 and an embodiment of the spectrum management function 26 in the server. Thus, the flow diagram may be thought of as depicting steps of one method carried out by the electronic device 10 and another method carried out by the server 12. Although the flow chart shows a specific order of executing functional logic blocks, the order of executing the blocks may be changed relative to the order shown. Also, two or more blocks shown in succession may be executed concurrently or with partial concurrence. One or more blocks may be omitted.

In block 72, the electronic device 10 determines its current location. For a fixed location device, the determination of location may include accessing a stored location value from the memory 28 of the electronic device 10. For a fixed location device or a mobile device, the determination of location may include using a location determination means, such as the GPS receiver 16. Other location determining means includes using assisted GPS (A-GPS), using cellular network location services (e.g., cellular base station triangulation), using Internet-based location services (e.g., a location service that determines location based on wireless LAN detection), or using some other location assessment technique.

In one embodiment, determining the location of the electronic device 10 results in establishing location coordinates for the electronic device and accuracy information for the determined location. As will be described in greater detail, the spectrum management server 12 uses the accuracy information to dynamically increase a separation distance for the electronic device 10 when determining available channels for the electronic device 10. The accuracy information may take one of several forms. An exemplary form for the accuracy information is an accuracy value specified as a distance to which the location coordinates are considered accurate by the electronic device 10, such as an accuracy of ±50 meters, ±100 meters, or some other distance value. Another exemplary form for the accuracy information is a confidence value for the accuracy of the location coordinates.

The confidence value is typically expressed as a percentage or other precision metric depending on the technique used to determine the location coordinates. Another exemplary form for the accuracy information is an identification of the technique (e.g., GPS, cellular tower triangulation, etc.) used to determine the location coordinates.

In block 74, the electronic device 10 transmits a spectrum request to the server 12. In the exemplary context where the electronic device 10 is a TVBD, the spectrum request may be a channel map request. The channel map request (also referred to as a white space registration request) may be replaced with another form of spectrum allocation request in situations where the electronic device 10 does not rely on available white space channels for wireless communications.

As part of the transmission in block 74, the electronic device 10 includes the location (e.g., specified as a geo-location coordinate set or other data set) determined in block 72 and the associated accuracy (e.g., an accuracy value specified as a distance, a degree of confidence, or a location-determining technique). The location in the transmission is referred to as a reported location.

The transmission of block 74 is received by the server 12 in block 76. In block 78, the spectrum management server 12 determines spectrum (e.g., white space channels) that are available for use by the electronic device 10 from which the request is received. The electronic device 10 from which the request is received is also referred to as the requesting radio device or requesting electronic device 10. The determination is made using the location of the requesting electronic device 10 and a contour separation distance for the electronic device 10.

The server 12 determines the contour separation distance so that the potential interfering signal propagation range of radio emissions from the electronic device 10 will not overlap with a protected area 68 of any of the incumbent radio devices 66. More specifically, if the reported location of the electronic device 10 is within the contour separation distance from the outer boundary (i.e., contour 70) of the protected area 68 of an incumbent radio device 66, then the channel(s) used by the incumbent radio device 66 is not available for use by the requesting electronic device 10.

In one embodiment, the contour separation distance is a function of a minimum separation distance for the requesting electronic device 10 and an additional distance, referred to as an accuracy variance. The accuracy variance reflects the degree of accuracy of the reported location for the requesting electronic device 10. In one embodiment, the contour separation distance is the minimum separation distance plus a value of the accuracy variance.

The minimum separation distance may be a distance established by regulation applicable to the electronic device 10. In another embodiment, the minimum separation distance is established by the server 12 as a distance at which the server 12 predicts (e.g., using a path loss model) that the electronic device 10 will not interfere with reception of signals from a protected radio device 66 assuming that the reported location for the electronic is one hundred percent accurate. In this embodiment, the minimum separation distance is established by the server 12 based on the capabilities or characteristics of the requesting electronic device 10 (e.g., transmit power, antenna height, etc.).

The accuracy variance may be determined by the server 12 and is a function of the accuracy information provided by the requesting electronic device 10. In this regard, the accuracy variance is a function of a level of accuracy of the location determination made by the requesting electronic device 10. In one embodiment, when the accuracy information is a distance value to which the location coordinates are considered accurate by the electronic device 10, then the accuracy variance may be the distance value. This approach may be most applicable when the server 12 determines the minimum separation distance using at least one of capabilities or characteristics of the requesting electronic device 10. Alternatively, the accuracy variance may be the difference between the distance value from the accuracy information and a location accuracy threshold (e.g., the 50 meter accuracy specified for TV white spaces management). This approach may be most applicable when the minimum separation distance is established by regulation applicable to the electronic device 10 and the regulation-established minimum separation distance is based on an assumed or regulation-required accuracy for location determination. The accuracy variance should not be less than zero even if the difference between the distance value from the accuracy information and the location accuracy threshold is less than zero.

In other embodiments, the accuracy variance is determined by the spectrum management server 12 using the alternative types of accuracy information discussed above. For example, if the accuracy information reflects a degree of confidence, the degree of confidence may be mapped to an accuracy variance specified as a distance. This mapping may be accomplished using a look-up table containing predetermined values or by a mathematical function.

As another example, if the accuracy information is the type of location-determining technique used to determine the location coordinates, then the spectrum management server 12 may use a predetermined value (specified as a distance) to which the location coordinates are considered accurate for the reported technique. The predetermined value may be adjusted based on characteristics of the electronic device 10 (e.g., antenna height, transmit power settings, situated indoors or outdoors, etc.) and various considerations that can be determined from the reported location. Considerations that can be determined from the reported location include, for example, whether the requesting device is in an urban or rural setting, surrounding terrain, etc. This adjustment, if made, may be accomplished by using a look-up table containing predetermined values or by a mathematical function. Also, in one embodiment, the location accuracies for different methods of determining geo-location are normalized to ensure consistent application of any adjustments to interference protection by use of an accuracy variance.

As will be appreciated, the location accuracy may be reported by the electronic device 10 explicitly as a distance value and used directly by the server 12 as the accuracy variance, or the spectrum management database system may infer a distance value for the location accuracy based on the method used for determining geo-location and/or other factors.

In the event where the electronic device 10 does not provide accuracy information as part of the request transmitted in block 74, the spectrum management server 12 may use a predetermined value to which the location coordinates are considered accurate.

As shown in FIG. 2, which is not to scale, the minimum separation distance surrounding the requesting electronic device 10 is indicated by $D_A$ and the accuracy variance is indicated by $D_B$. In the foregoing embodiment where the contour separation distance is the minimum separation distance $D_A$ plus the accuracy variance $D_B$, the resulting length (sum of $D_A$ and $D_B$) may be used as a radius to draw a circle around the reported location of the electronic device 10. If the circle overlaps with a protected area 68, then the channel used by the protected device 66 associated with the overlapping protected area 68 will not be available for use by the electronic device 10. In the illustrated example, incumbent devices 66c and 66d have protected areas 68 that overlap with the circle defined by the contour separation distance. Therefore, the channels occupied by incumbent devices 66c and 66d are not available for use by the requesting electronic device in this example.

Another way to express the foregoing technique to determine which channels are available or not available for use by the electronic device 10 is to measure the distance from the reported location of the electronic device 10 to the nearest point on each nearby contour 70. For each contour 70, if the distance between the electronic device 10 and the contour 70 is smaller than the contour separation distance, then the channel corresponding to the contour 70 is not available. Similarly, if the distance between the electronic device 10 and the contour 70 is greater than the contour separation distance, then the channel corresponding to the contour 70 is available. The server 12 may conduct this evaluation for each contour 70 that is within a range of consideration from the reported location of the electronic device 10. The range of consideration may depend on the type of the requesting electronic device 10. Exemplary values for the range of consideration include 10 kilometers and 100 kilometers. Each channel that is not occupied by a protected device 66 having a contour 70 within the range of consideration may be considered available for use by the electronic device 10.

Continuing with the example of FIG. 2, the protected areas 68a and 68b of incumbent devices 66a and 66b do not overlap with a circle having a center at the reported location of the electronic device 10 and the contour separation distance as the circle's radius. Therefore, the channels occupied by incumbent devices 66a and 66b will be considered available for use by the electronic device 10.

An advantage of the disclosed technique for determining channel availability is that the separation distance for the electronic device 10 may be dynamically adjusted. That is, differences in the accuracy information provided by the electronic device 10 from one request to another request may be taken into consideration. Differences in accuracy information may change over time since a distance value for accuracy may change depending on changes in location of the electronic device 10 or different location determination techniques may be used at different times or in different locations. Also, the server 12 may make modifications if it is found that one or more incumbent radio devices 66 require more, or less, protection from interference. The adjustments may be automatically applied the next time the electronic device 10 requests spectrum.

In another embodiment, the spectrum management server 12 determines the contour separation distance (minimum separation distance between a protected contour 70 for a protected entity 66 and the requesting electronic device 10) as the sum of 1) the minimum separation distance $D_A$, 2) the accuracy variance $D_B$, and 3) a confidence factor, which is labeled as $D_C$ in FIG. 2. The confidence factor $D_C$ is a value that is specified as a distance and that expresses a level of confidence in the accuracy information provided by the requesting radio device. In one embodiment, the confidence factor may be used to account for setting of the requesting electronic device 10 (e.g., indoors, outside, urban location, rural location, terrain, etc.), known location determination error for the requesting electronic device 10 or device class, or other reason for increasing (or decreasing by using a negative value) the contour separation distance. A look-up table may be used to determine a value for the confidence factor from one or more variables, such as the level of confidence in the accuracy value, setting of the requesting electronic device 10, known location determination error, etc.

In the embodiment where the contour separation distance is the minimum separation distance $D_A$ plus the accuracy variance $D_B$ plus the confidence factor $D_C$, the distances between the reported location of the electronic device 10 and the contours 70b, 70c and 70d of protected devices 66b, 66b and 66d are less than the contour separation distance. Therefore, the channels occupied by protected devices 66b, 66b and 66d are not available for use by the requesting electronic device 10. But the protected contour 70a of incumbent device 66a is further from the reported location of the electronic device 10 than the contour separation distance. Therefore, the channel occupied by incumbent device 66a is considered available for use by the requesting electronic device 10.

With continued reference to FIG. 3, once each channel that is available for use by the requesting electronic device 10 is determined in accordance with the contour separation distance, the spectrum management server 12 generates a channel map containing the available channels in block 80. Then, in block 82, the spectrum management server 12 transmits the channel list to the requesting electronic device 10 in block 82. The channel list is received by the electronic device 10 in block 84. In some embodiments, such as when the electronic device 10 is a TVBD, the requesting electronic device 10 selects, in block 86, a channel from the available channel list and conducts wireless communications using the selected channel.

E. ADDITIONAL DESCRIPTION

Separation distances are specified in the spectrum-governing regulations to provide a minimum level of interference protection for incumbent spectrum users. Interference is a function of power and distance. As such, in one embodiment, the spectrum management server 12 may instead adjust the power level at which the requesting electronic device 10 may transmit to maintain the specified level of interference protection, with or without altering the separation distances. This adjustment also would be based on the variance of the location accuracy from the accuracy requirement using the same approach that is described above for varying the separation distances, but applied to allowable transmit power level of the requesting device. It is noted that regulations regarding white space use in the U.S. do not currently support variable power levels.

The foregoing techniques for spectrum management allow for interference protection (e.g., as controlled by separation distances) to be dynamically adjusted based on the location accuracy reported by a radio device.

Also, a spectrum management server 12 that takes into consideration geo-location of various radio transmitters and one or both of accuracy of the location or confidence in the degree of accuracy provides dynamic interference adjustment to protected incumbent radio devices while allowing access to available spectrum to other radio devices.

Aspects of the above-described techniques are applicable to providing available channel lists to mobile devices. But these approaches also may be applied to fixed location radio devices. Some fixed location radio devices are manually provisioned with their respective locations by a professional installer. In some instances, the fixed location radio device may be installed at a location that does not allow the installer to accurately determine the device's location, such as when the device is inside a relatively well-constructed or large building in which GPS does not work well. In this situation, a location accuracy value is also provisioned. In one embodiment, the location accuracy value for this situation is a straight-line distance between the actual installation location of the fixed location radio device and a location where accurate GPS coordinates are obtainable. The GPS coordinates obtained at that location are used for the reported location of the device. In this embodiment, the spectrum management server 12 may increase the separation distance for the electronic device 10 by the straight-line distance, thus maintaining protection for incumbents. Thus, in this embodiment, the contour separation distance may be the sum of 1) the minimum separation distance for the fixed location radio device, 2) an accuracy variance for GPS or other location determining technique that was used to determine the reported location, 3) the straight-line distance, and 4) a confidence factor (which may be zero or ignored in certain circumstances).

The techniques also may be applied to collaboratively planning the location or channel usage of one or more radio devices that are located near other radio devices. Again, since interference calculations are based on location, power, and distance, inexactness in location accuracy may affect the calculated (e.g., predicted) interference. By applying the foregoing concepts and techniques, the "expected" interference between devices may be adjusted (up or down) based on the reported location accuracy.

Another variation to the disclosed techniques is to have the spectrum management server 12 combine the location and accuracy information reported by the requesting electronic device 10 with other information available to the spectrum management server 12, but that is not available to the requesting electronic device 10. This has the effect of improving the reported location or the reported accuracy. Information that may be combined may be terrain data or setting knowledge, reported values from other nearby devices, etc.

F. CONCLUSION

Although certain embodiments have been shown and described, it is understood that equivalents and modifications falling within the scope of the appended claims will occur to others who are skilled in the art upon the reading and understanding of this specification.

What is claimed is:

1. A method of allocating spectrum to a secondary radio device, comprising:
   receiving a reported location of the secondary radio device and accuracy information for the reported location, the secondary radio device having a minimum separation distance from protected areas of primary radio devices;
   determining an accuracy variance for the secondary radio device, the accuracy variance specified as a distance and is a function of the accuracy information for the reported location;
   determining a contour separation distance for the secondary radio device, the contour separation distance comprising a sum of the minimum separation distance and the accuracy variance; and
   if a distance between a contour of a protected area for a primary radio device and the reported location for the secondary radio device is less than the contour separation distance, determining that a channel used by the primary radio device is not available for use by the secondary radio device for wireless communications, otherwise the channel used by the primary radio device is determined to be available for use by the secondary radio device for wireless communications.

2. The method of claim 1, further comprising, upon determining that the channel used by the primary radio device is available for use by the secondary radio device for wireless communications, transmitting a spectrum allocation to the secondary radio device containing data indicating that the channel used by the primary radio device is available for use by the secondary radio device for wireless communications.

3. The method of claim 2, wherein the spectrum allocation is a white spaces channel list.

4. The method of claim 1, wherein the minimum separation distance is set by regulation.

5. The method of claim 1, wherein the minimum separation distance is determined as a function of at least one of capabilities or configuration of the secondary radio device.

6. The method of claim 1, wherein the accuracy variance is an accuracy value received from the secondary radio device as part of the accuracy information minus a location accuracy threshold that is used as a factor in establishment of the minimum separation distance.

7. The method of claim 1, wherein the accuracy variance is determined as a function of a technique used to determine the location of the secondary radio device.

8. The method of claim 1, wherein the contour separation distance further comprises a confidence factor that is specified as a distance and is added to the sum of the minimum separation distance and accuracy variance.

9. The method of claim 8, wherein the confidence factor is a function of one or more of a level of confidence in an accuracy value received from the secondary radio device as part of the accuracy information, a setting of the secondary radio device, or a location determination error for the secondary radio device.

10. The method of claim 1, wherein the contour separation distance further comprises a distance between an installation location of the secondary radio device and a location at which the reported location is determined.

11. A spectrum management server system for allocating spectrum to a secondary radio device, comprising:
    a communications interface over which a reported location of the secondary radio device and accuracy information for the reported location is received, the secondary radio device having a minimum separation distance from protected areas of primary radio devices; and
    a processor that executes logical instructions to:
       determine an accuracy variance for the secondary radio device, the accuracy variance specified as a distance and is a function of the accuracy information for the reported location;
       determine a contour separation distance for the secondary radio device, the contour separation distance comprising a sum of the minimum separation distance and the accuracy variance; and
       determine that a channel used by a primary radio device is not available for use by the secondary radio device for wireless communications if a distance between a contour of a protected area for the primary radio device and the reported location for the secondary radio device is less than the contour separation distance, otherwise determine that the channel used by the primary radio device is available for use by the secondary radio device for wireless communications.

12. The spectrum management server system of claim 11, wherein upon determining that the channel used by the primary radio device is available for use by the secondary radio device for wireless communications, the spectrum management server system transmits a spectrum allocation to the secondary radio device containing data indicating that the channel used by the primary radio device is available for use by the secondary radio device for wireless communications.

13. The spectrum management server system of claim 12, wherein the spectrum allocation is a white spaces channel list.

14. The spectrum management server system of claim 11, wherein the minimum separation distance is set by regulation.

15. The spectrum management server system of claim 11, wherein the minimum separation distance is determined as a function of at least one of capabilities or configuration of the secondary radio device.

16. The spectrum management server system of claim 11, wherein the accuracy variance is an accuracy value received from the secondary radio device as part of the accuracy information minus a location accuracy threshold that is used as a factor in establishment of the minimum separation distance.

17. The spectrum management server system of claim 11, wherein the accuracy variance is determined as a function of a technique used to determine the location of the secondary radio device.

18. The spectrum management server system of claim 11, wherein the contour separation distance further comprises a confidence factor that is specified as a distance and is added to the sum of the minimum separation distance and accuracy variance.

19. The spectrum management server system of claim 11, wherein the confidence factor is a function of one or more of a level of confidence in an accuracy value received from the secondary radio device as part of the accuracy information, a setting of the secondary radio device, or a location determination error for the secondary radio device.

20. The spectrum management server system of claim 11, wherein the contour separation distance further comprises a distance between an installation location of the secondary radio device and a location at which the reported location is determined.

* * * * *